United States Patent
Ramamurthy

(10) Patent No.: US 8,312,104 B2
(45) Date of Patent: Nov. 13, 2012

(54) INTERACTIVE INFORMATION DISSEMINATION AND RETRIEVAL SYSTEM AND METHOD FOR GENERATING ACTION ITEMS

(75) Inventor: Kannan Ramamurthy, Novi, MI (US)

(73) Assignee: General Motors LLC, Detroit, MI (US)

( * ) Notice: Subject to any disclaimer, the term of this patent is extended or adjusted under 35 U.S.C. 154(b) by 724 days.

(21) Appl. No.: 12/166,310

(22) Filed: Jul. 1, 2008

(65) Prior Publication Data

US 2010/0005152 A1   Jan. 7, 2010

(51) Int. Cl.
G06F 15/16 (2006.01)
(52) U.S. Cl. ........ 709/217; 709/204; 709/203; 709/206; 709/205; 709/218; 709/249
(58) Field of Classification Search .................. 709/204, 709/205, 217, 249, 218; 707/100, 102
See application file for complete search history.

(56) References Cited

U.S. PATENT DOCUMENTS

| | | | |
|---|---|---|---|
| 7,433,876 B2 * | 10/2008 | Spivack et al. .................. 1/1 |
| 7,640,267 B2 * | 12/2009 | Spivack et al. .................. 1/1 |
| 7,689,682 B1 * | 3/2010 | Eldering et al. ............. 709/223 |
| 7,756,945 B1 * | 7/2010 | Andreessen et al. ......... 709/217 |
| 2007/0067297 A1 * | 3/2007 | Kublickis ..................... 707/9 |
| 2007/0288497 A1 | 12/2007 | Droznin et al. |
| 2008/0052343 A1 | 2/2008 | Wood |
| 2008/0082416 A1 | 4/2008 | Kotas et al. |
| 2008/0235005 A1 * | 9/2008 | Golan et al. ................... 704/9 |
| 2009/0170434 A1 * | 7/2009 | Tengler et al. ............. 455/41.2 |
| 2010/0223261 A1 * | 9/2010 | Sarkar ....................... 707/726 |

OTHER PUBLICATIONS

Betsy Friedrich; Fictional Blogs: How Digital Narratives are Changing the Way We Read and Write, Coe College, Feb. 14, 2007, pp. 1-132.*
Amanda B. Lenhart; Unstable Texts: An Ethnographic Look at How Bloggers and their Audience Negotiate Self-presentation, Authenticity and Norm Formation; Thesis, Georgetown University, Apr. 21, 2005, pp. 1-193.*
Salton et al., "Term-Weighting Approaches in Automatic Text Retrieval", Information Processing and Mgmt, vol. 24, No. 5, 1988, pp. 513-523.

* cited by examiner

*Primary Examiner* — Carl Colin
*Assistant Examiner* — Mohammad Siddiqi
(74) *Attorney, Agent, or Firm* — Dierker & Associates, P.C.

(57) ABSTRACT

An interactive information dissemination and retrieval system is disclosed herein. The system includes a website configured to host a blog and to receive at least one blog post. An information retrieval reporting system is configured to i) extract a first set of tags from the blog and a second set of tags from the at least one blog post and ii) recognize a semantic relationship between the first and second sets of tags. At least one analyzer is included in the system and is configured to analyze the semantic relationship and generate at least one action item based on the semantic relationship. Method(s) for generating action item(s) are also disclosed herein.

17 Claims, 4 Drawing Sheets

INTERACTIVE INFORMATION DISSEMINATION AND RETRIEVAL SYSTEM AND METHOD FOR GENERATING ACTION ITEMS

TECHNICAL FIELD

The present disclosure relates generally to an interactive information dissemination and retrieval system and a method for generating action items.

BACKGROUND

Businesses often develop schemes and gimmicks for retaining customers and for attracting new customers. With the advent of large corporations, the focus of customer retention has generally shifted from customer engagement to other qualifiers, such as customer service, product quality, pricing, etc. Many companies attempt to match or beat their competitor's qualifiers for customer retention. As a result, customer loyalties stray, and companies resort to all kinds of customer retention programs including, but not limited to special offers, discounts, event oriented communication programs, points and rewards programs, after sales customer support, or the like.

SUMMARY

An interactive information dissemination and retrieval system is disclosed herein. The system includes a website configured to host a blog and to receive at least one blog post. An information retrieval reporting system is configured to i) extract a first set of tags from the blog and a second set of tags from the at least one blog post and ii) recognize a semantic relationship between the first and second sets of tags. At least one analyzer is included in the system and is configured to analyze the semantic relationship and generate at least one action item based on the semantic relationship.

BRIEF DESCRIPTION OF THE DRAWINGS

Features and advantages the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method and system disclosed herein advantageously deliver niche content to customers/subscribers and utilize customer/subscriber responses to the niche content to develop products and services. In some instances, the niche content is related to vehicle relationship events, and the customers/subscribers are vehicle owners/users who subscribe to a vehicle service system. Tags are generated for the niche content and for the responses, and semantic relationships between the tags are recognized. Product and/or service offerings may then be generated, where such offerings may advantageously reflect customer subscriber needs and/or interests.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. As such, indirect communication may include communication between two components with additional component(s) located therebetween.

Figure 1:
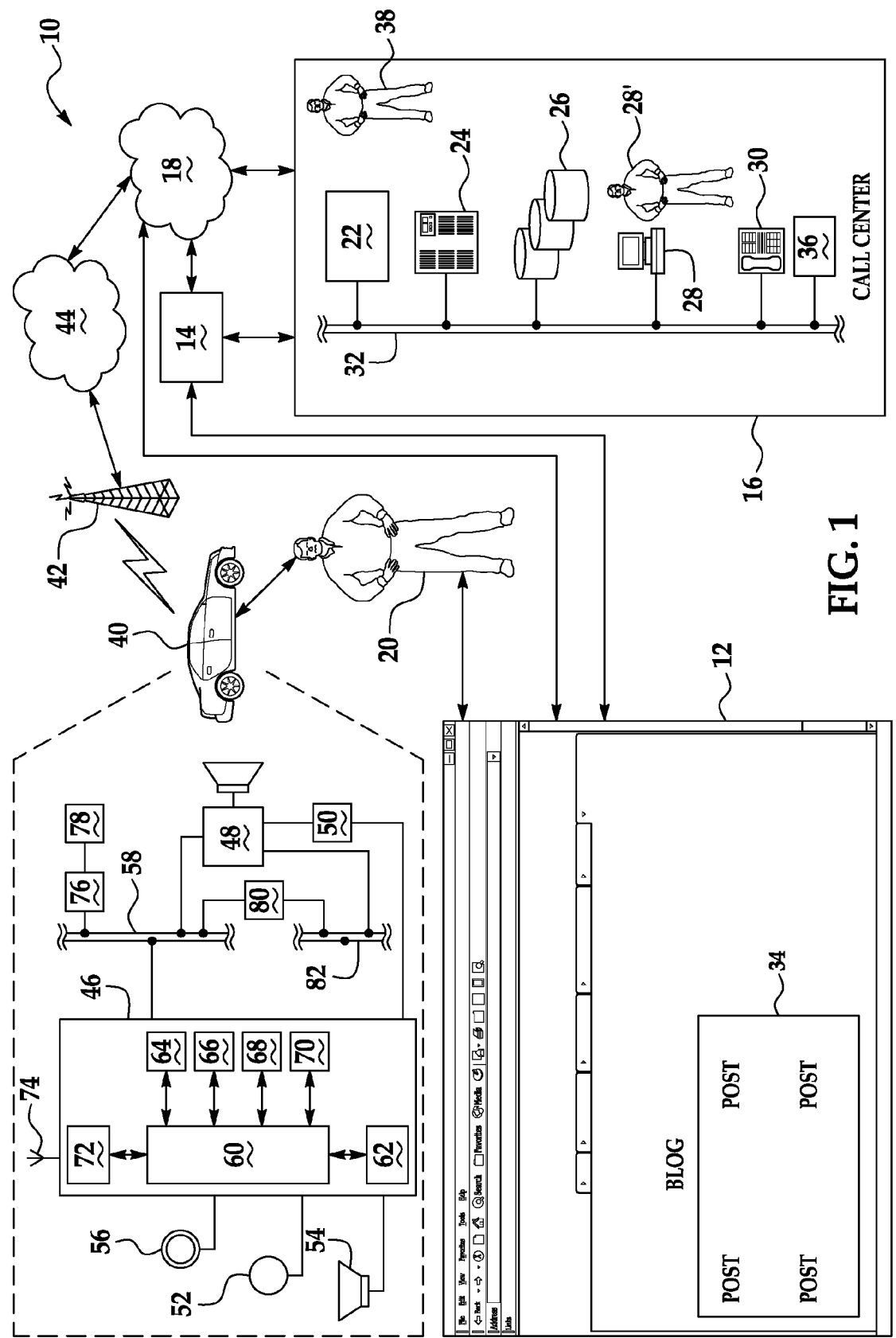
FIG. 1 is a schematic view of an example of an interactive system for disseminating and retrieving information.
Figure 2:
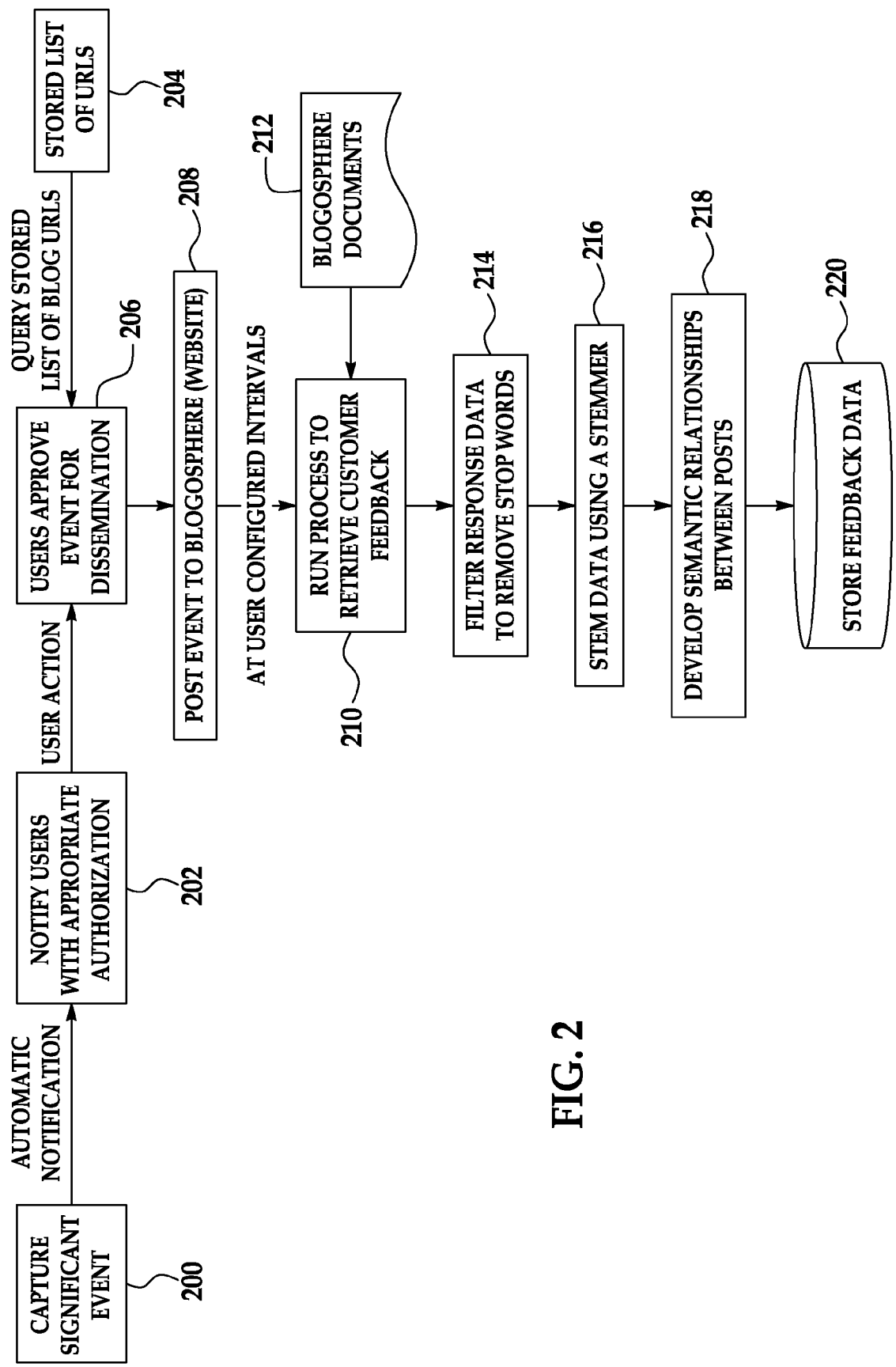
FIG. 2 is a flow diagram illustrating an example of a method for generating at least one action item.

Referring now to FIGS. 1 and 2 together, an example of the interactive information dissemination and retrieval system 10, and an example of the method for using the system 10 to generate one or more action items are respectively depicted. The system 10 includes a website 12 that is supported and hosted by a server 14, and a call center 16 that operates the website 12. In some instances, the system also includes a vehicle 40 and a wireless carrier/communication system, including but not limited to, one or more cell towers 42, one or more base stations and/or mobile switching centers (MSCs) 44, one or more land networks 18, and one or more service providers (not shown). In an example, the wireless carrier/communication system is a two-way radio frequency communication system.

It is to be understood that the server 14 may be directly connected to the call center 16 or may be operatively connected to the call center 16 via a land network 18. The land network 18 may be a conventional land-based telecommunications network that is connected to one or more landline telephones and connects the server 14 to the call center 16. For example, land network 18 may include an Internet protocol (IP) network. It is to be understood that one or more segments of the land network 18 may be implemented in the form of a standard wired network, a fiber of other optical network, a cable network, other wireless networks such as wireless local networks (WLANs) or networks providing broadband wireless access (BWA), or any combination thereof.

The call center 16 is designed to provide service subscribers 20 and vehicle 40 associated therewith a number of different system back-end functions. According to the example shown here, the call center 16 includes one or more switches 22, servers 24, databases 26, live and/or automated advisors

28, 28', as well as a variety of other telecommunication and computer equipment 30 that is known to those skilled in the art.

The various call center components are coupled to one another via a network connection or bus 32. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

Switch 22, which may be a private branch exchange (PBX) switch, routes incoming signals so that voice transmissions are usually sent to either the live advisor 28' or an automated response system 28, and data transmissions are passed on to a modem or other piece of equipment (not shown) for demodulation and further signal processing. The modem preferably includes an encoder, and can be connected to various devices such as the server 24 and database 26.

The database 26 may be designed to store subscriber profile records, subscriber behavioral patterns, or any other pertinent subscriber information. Although the illustrated example has been described as it would be used in conjunction with a manned call center 16, it is to be appreciated that the call center 16 may be any central or remote facility, manned or unmanned, mobile or fixed, to or from which it is desirable to exchange voice and data communications. As such, the live advisor 28' may be physically present at the call center 16 or may be located remote from the call center 16 while communicating therethrough.

It is to be understood that, although a service provider (not shown) may be located at the call center 16, the call center 16 is a separate and distinct entity from the service provider. In an example, the service provider is located remote from the call center 16. A service provider provides the user 20 with telephone and/or Internet services. The service provider is generally a wireless carrier (such as, for example, Verizon Wireless®, AT&T®, Sprint®, etc.). It is to be understood that the service provider may interact with the call center 16 to provide service(s) to the user 20.

The website 12 is generally associated with and operated by the call center 16 or a company that is associated with the call center 16. Generally, the website 12 is configured to host one or more blogs, and to receive one or more user uploaded responses, comments, questions and/or other posts submitted in response to the blog(s).

The blogs are related to vehicle relationship events or other vehicle related events, which include any event that is deemed relevant to the subscriber 20 community and/or to the services or products offered by the company posting the blog. It is to be understood that the general purpose of the blog is to generate new or renewed interest in the subscriber community and/or products/services offered by the company. Non-limiting examples of vehicle relationship or related events include when the company acquires a predetermined number of subscribers 20, when a predetermined number of subscribers 20 receive a particular service (e.g., turn-by-turn navigation instructions) from the call center 16, when a predetermined number of subscribers 20 benefit from a program set up by the company, when a new customer service program is introduced, when the first online destination community is built by subscribers 20, or the like.

Generally, the blogs are generated by employees, contractors or other authorized persons 38 that have access to statistics, other factual data and/or other information associated with the vehicle relationship or related events. In some instances, such data is generated over time (e.g., statistics). In other instances, the data is related to upcoming events or ongoing programs. Any data and/or information may be stored in and retrieved from the database 26. The data and/or information may also come from an outside source, such as, for example, a statistics company hired to generate such data. It is to be understood that the authorized persons 38 are able to access and analyze data that he/she deems relevant, and to generate the blogs based on the analysis.

A non-limiting example of the generation of the blog is shown at reference numerals 200 and 202 in FIG. 2. At reference numeral 200, one or more significant events are captured, and at reference numeral 202, the authorized person(s) 38 is/are notified of such events. The capturing of significant events generally involves gathering or transmitting statistics, other factual data and/or other information associated with vehicle relationship or related events. In one instance, as shown at 202 in FIG. 2, such information is automatically transmitted to the authorized person 38. In another instance, not shown in FIG. 2, the authorized person 38 captures such information. The authorized person(s) 38 then generate the blog based on the captured information, as depicted by "User Action" in FIG. 2.

The blog may include completely original text generated by the authorized person 38, or it may include at least some of the data and/or information that is captured and analyzed. As an example, if the blog is related to the success of a particular program offered by the company, the blog may include statistical data that is indicative of such success. As another example, if the blog is related to the introduction of a new vehicle, the blog may include features of the new vehicle. It is to be further understood, however, that it may be desirable to omit such data and/or information from the blog.

As shown in FIG. 2, the authorized person 38 may access or query a stored list of blog URLs 204. Such a list 204 may include URLs operated by and/or previously used by the company posting the current blog. The authorized person 38 may query such a list 204 in order to determine which URL is most appropriate for the current blog.

Once the blog is generated and the URL is selected, the authorized person 38, or another person(s) in a position to authorize the posting of the blog, approves the blog for dissemination, as shown at reference numeral 206 in FIG. 2

Once approved for dissemination, the blog is posted to the website 12, as shown at reference numeral 208 in FIG. 2. In one example, blog(s) including original text may be generated at an electronic device of the authorized person 38 and then uploaded from the electronic device to the website 12. In another example, the blog may be generated directly on the website 12. In still another example, blog(s) composed entirely of data and/or information may be uploaded directly from the database 26 storing such data/information.

The blog may be posted on any desirable page and/or area of the website 12, and may be posted for any desirable time period. In some instances, it may be desirable to post the blog on the home page of the website 12, but in other instances it may be desirable to post the blog on a page other than the home page. When the blog is posted on a non-home page of the website 12, it may also be desirable to provide a link to the blog on the home page.

In an example in which the blog is uploaded or posted via one or more of the authorized persons 38, such person(s) 38 request access to a secure portion of the website 12. This may be accomplished via a particular page on the website 12. The server 14 receives the request and verifies that the requester is in fact an authorized person 38. The verification may be accomplished, for example, by verifying a username and password provided by the requester. The verification may be performed using standard LDAP or active directory interfaces. Once the requester is authenticated, he/she is granted access to the secure portion of the website 12 which includes a user interface that enables content additions, deletions and/or changes to be made to the website 12. If the requester is not authenticated, it is to be understood that he/she is denied access to the secure portion of the website 12 and is unable to post the blog.

In some instances, the posted blog is viewable by anyone capable of accessing the general website 12. In these instances, both subscribers 20 and non-subscribers may view the blog(s) and post responses thereto. In other instances, the blog is posted on a secure page of the website 12 that is accessible to subscribers 20 having an account associated with the website 12. In such instances, the subscriber 20 may access the secure page by inputting subscriber-specific information at the website 12. The subscriber-specific information may include, for example, the user's name, a password, an account number, and/or any other identifying information. Upon verification of the inputted information, the subscriber 20 is granted access to the blog and the message board or weblog 34 for generating a post/response to the blog.

Generally, the website 12 is accessible to the subscriber 20 via a computer or other device (e.g., desktop, notebook, mobile phone, or personal digital assistant) configured to access the Internet. In an example, the computer or other device includes, or is in communication with, an input device (e.g., a keyboard and/or mouse) and a display (e.g., a monitor and/or one or more speakers). It is to be understood that the communication between the computer or other device and the server 14 hosting the website 12 may be wired and/or wireless.

After reading one or more of the blogs, the subscriber 20 may post a response thereto on the message board or weblog 34 of the website 12. The blog post is generally representative of a particular subscriber's 20 thoughts, comments, suggestions and/or questions about the blog.

The website 12 is configured to download any generated post to the database 26 at the call center 16, as shown at reference numeral 210 in FIG. 2. It is to be understood that the authorized person(s) 38 may configure the website 12 such that blog posts (e.g., customer feedback) are retrieved at predetermined intervals (daily, monthly, etc.). The original blog and/or any downloaded posts for a particular interval form blog document(s) 212. The blog documents make up a single collection of documents that is analyzed to generate the action item(s). As an example, the original blog may be one blog document in the collection, and posts from a particular day, month, etc. may be another blog document in the collection. Both the blog document and the collection are further discussed in reference to FIG. 4.

The blog documents (e.g., the blog and the received posts) are subjected to an information retrieval reporting system 36, which generates a set of tags related to the blog and a set of tags related to the posts. It is to be understood that the blog tags may be generated when the blog is generated, when the blog is posted, or when the post tags are generated. Furthermore, it is to be understood that the post tags may be generated at any time after at least one post is received. The information retrieval reporting system 36 includes one or more algorithms (discussed further hereinbelow in reference to FIG. 4) specifically designed to generate the sets of tags, where each tag is indicative of relevant or meaningful information within the blog and/or within the received posts. Relevant or meaningful information from the blog may include key words and/or phrases that are indicative of the blog subject matter, and relevant or meaningful information from the posts may include words and/or phrases that appear multiple times throughout the post(s) or that are related to the blog subject matter.

The information retrieval reporting system 36 may filter the blog documents or the tags generated therefrom to remove stop words (i.e., articles such as an, the, etc.), as shown at reference numeral 214 in FIG. 2. It is to be understood that the system 36 may be programmed to recognize and filter out such words from the blog documents or the tags generated therefrom. Further, it is to be understood that, in some instances, a filtering function may be disabled, or the information retrieval reporting system 36 may not be configured to filter the received blog documents and/or tags.

It is to be understood that each tag may also be exposed to a stemmer algorithm in order to reduce the tag word to its most basic form, as shown at reference numeral 216 in FIG. 2.

The generated sets of tags are then compared so that a semantic relationship between the tags may be generated, as shown at reference numeral 218 of FIG. 2. The semantic relationship may be the result of an algorithm (described further hereinbelow in reference to FIG. 4) that is configured for analyzing the tags and recognizing such a relationship.

It is to be understood that a subscriber 20 interest level may also be generated from the blog post(s). The interest level may be determined based on the number of posts received and/or the positive or negative feedback contained within the posts.

The tags, semantic relationship information, and/or interest level information may be stored (e.g., in database 26, and as shown in reference numeral 220 of FIG. 2) in a relational format so that standard SQL queries may be performed against the information. Such information may be displayed to the authorized person 38 in the form of a graph, spreadsheet, or any other suitable format.

The authorized person(s) 38 (and anyone else working with the authorized person 38) then analyze the tags, the semantic relationship, and/or the interest level, and generate at least one action item based upon such analysis. The action item may pertain to, for example, a new product offering, a new service offering, a product update, a service update, or combinations thereof.

Figure 3:
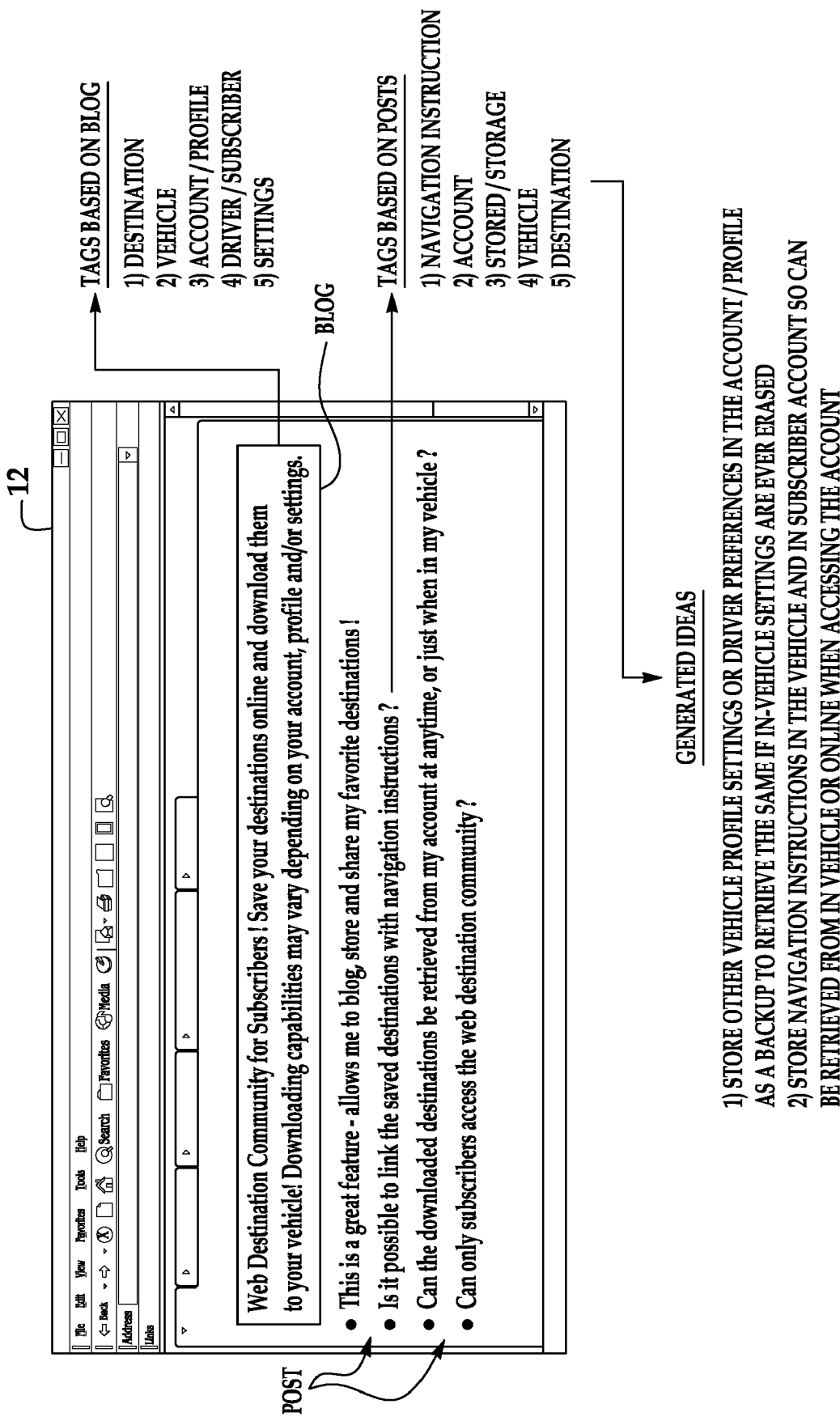
FIG. 3 is a schematic diagram of an example of a website including a blog and posts, tags generated from the blog and posts, and ideas/action items generated based on a semantic relationship between the tags.

FIG. 3 illustrates a non-limiting example of the website 12 having a blog and posts, tags that may be generated from the blog and posts, and action items that are generated based on analysis of the semantic relationship between the tags. The website 12 shown in FIG. 3 illustrates a blog stating that a web destination community has been created for subscribers, and that this service enables subscribers 20 to save their destinations online and then download them to their vehicle(s) 40. The blog further informs the subscribers 20 that downloading capabilities may vary depending on the type of account they have, their user profile, and/or the settings associated with their account/profile.

The website 12 also depicts four posts that have been uploaded in response to the blog. The posts generally include questions or comments about the program discussed in the blog.

The algorithms of the information retrieval reporting system 36 generate two sets of tags, one of which is based on the blog, and the other of which is based on the posts. Keywords, such as vehicle, account, settings, navigation instructions, and store, from the blog and posts are selected as the tags. The algorithm determines which words within the blog and posts are meaningful based upon their occurrence throughout the blog/posts, the relevancy of the post words to the content of the blog, or other like factors. As shown in FIG. 3, some of the tags may overlap between the two sets, while others may be different.

Several ideas/action items may be generated after analyzing the semantic relationship between the tags. Two non-limiting examples of such ideas are shown in FIG. 3.

Figure 4:
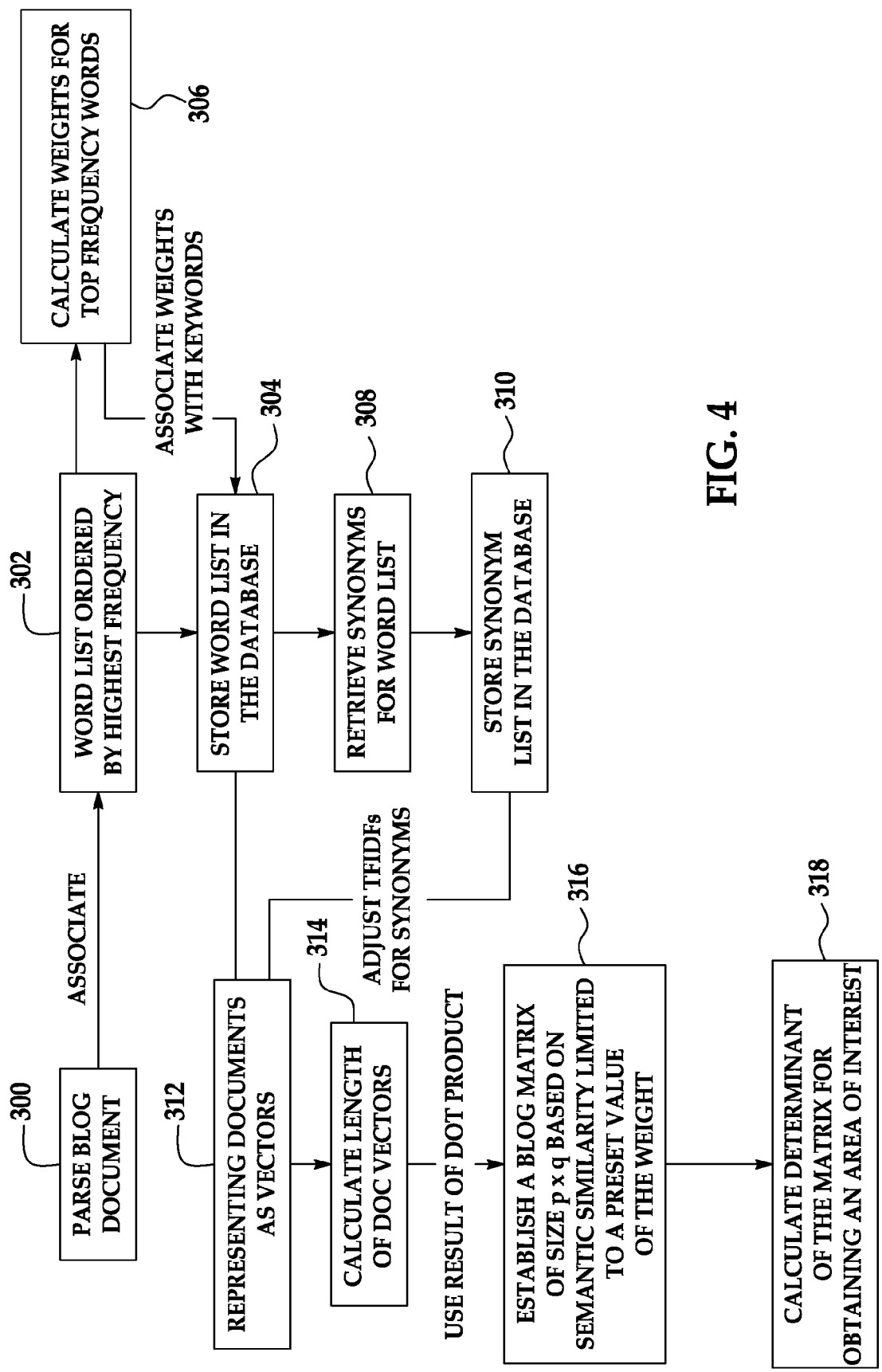
FIG. 4 is a flow diagram illustrating an example of an algorithm for generating a set of tags for received posts and for generating ideas/action items.

FIG. 4 depicts a non-limiting example of the algorithm used to generate the tags, to recognize the semantic relationship, and to generate action items. At reference numeral 300, the blog document (including the blog and the posts) is parsed to generate the sets of tags. In this example, the blog and posts are parsed together, thereby generating a single list including the set of tags for the blog and set of tags for the posts. Parsing includes generating a list of the distinct words in the blog and posts, and then generating the stem of each word in the list. A stemmer algorithm may be used to reduce each word to its most basic form. As a non-limiting example, the blog may say, "OnStar® offers low mileage discount", and posts from the first day the blog is available may say: 1) "would OnStar lower price of low mileage subscribers?", 2) "would they use license or VIN to identify driving patterns?", and 3) "it will be good to renew if they lower subscription as well." The distinct set of words/tags and the stemmed words/tags generated via the algorithm are shown in Table 1 below.

TABLE 1

Generated Tags and Stemmed Tags

| Distinct Tags | Stemmed Tags |
|---|---|
| OnStar | OnStar |
| Offers | Offer |
| Low | Low |
| Mileage | Mileage |
| Discount | Discount |
| Would | Would |
| Lower | Price |
| Price | Subscribe |
| Subscribers | They |
| They | Use |
| Use | License |
| License | Or |
| Or | VIN |
| VIN | To |
| To | Identify |
| Identify | Drive |
| Driving | Pattern |
| Patterns | It |
| It | Will |
| Will | Be |
| Be | Good |
| Good | Renew |
| Renew | If |
| If | As |
| Lower | Well |
| Subscription | |
| As | |
| Well | |

Once the blog and posts are parsed, the stemmed tags are ordered by the frequency of the term in the document, as shown at reference numeral 302. This is accomplished by counting the number of times the respective words appear in the document, and then prioritizing the words/tags based on the frequency. A non-limiting example of the prioritization of the stemmed words of Table 1 is shown in Table 2.

TABLE 2

Prioritization based on Frequency

| Stemmed Tags | Frequency of Tag in Blog and 1st Day Posts |
|---|---|
| Low | 4 |
| OnStar | 2 |

TABLE 2-continued

Prioritization based on Frequency

| Stemmed Tags | Frequency of Tag in Blog and 1st Day Posts |
|---|---|
| Mileage | 2 |
| Would | 2 |
| They | 2 |
| To | 2 |
| Discount | 1 |
| Price | 1 |
| Subscribe | 1 |
| Use | 1 |
| License | 1 |
| Or | 1 |
| VIN | 1 |
| Identify | 1 |
| Drive | 1 |
| Pattern | 1 |
| It | 1 |
| Will | 1 |
| Be | 1 |
| Good | 1 |
| Renew | 1 |
| If | 1 |
| As | 1 |
| Well | 1 |
| Offer | 1 |

While not shown in FIG. 4, it is to be understood that another blog document may be parsed (e.g., when additional posts are retrieved, for example, posts from the next interval), and the stemmed tags may be updated and reprioritized to include the information from the additional blog document(s). In the example set forth hereinabove, posts from the second day that the blog is available may say: 1) "will mileage discount work with any insurance?", 2) "only auto insurance, or home insurance as well?", and 3) "will it be renewed automatically?" Table 3 illustrates the updated and reprioritized (based on frequency) stemmed tag set.

TABLE 3

Updated Prioritization based on Frequency

| Updated Stemmed Tags | Updated Frequency of Tag in Blog and 1st and 2nd Day Posts |
|---|---|
| Low | 4 |
| Mileage | 3 |
| Will | 3 |
| Renew | 2 |
| OnStar | 2 |
| It | 2 |
| Would | 2 |
| They | 2 |
| To | 2 |
| Discount | 2 |
| Be | 2 |
| As | 2 |
| Well | 2 |
| Insurance | 2 |
| Price | 1 |
| Subscribe | 1 |
| Use | 1 |
| License | 1 |
| Or | 1 |
| VIN | 1 |
| Identify | 1 |
| Drive | 1 |
| Pattern | 1 |
| Good | 1 |
| If | 1 |
| Offer | 1 |
| Auto | 1 |
| With | 1 |
| Any | 1 |

TABLE 3-continued

Updated Prioritization based on Frequency

| Updated Stemmed Tags | Updated Frequency of Tag in Blog and 1st and 2nd Day Posts |
|---|---|
| Home | 1 |
| Automatic | 1 |

As shown at reference numeral 304, the word list may be stored in a database (such as database 26 located at call center 16) prior to or after the weight of the words is calculated, as shown at reference numeral 306. The weight of the words (tk) in document(s) (dk) equals the product of the frequency of the word in the document(s) (tfkI)*log of total number of documents (N) divided by the number of documents that contain the word (dfk). An example of the equation for calculating the weight is represented by the following formula:

$$Wk,I = tfkI * (N/dfk). \quad (1)$$

In the example given herein, the total number of documents is 2, the first of which includes the blog and the $1^{st}$ day posts, and the second of which includes the $2^{nd}$ day posts. The top frequency words (as shown in Table 3) include low, mileage and renew. In this example, the frequency of the word low in document 1 is 4 and in document 2 is 0. As such, the weight of the word "low" for document $1 = 4*\log(2/1) = 1.2$, and the weight of the word "low" for document 2 will not be considered because it has 0 occurrences. Similarly, the frequency of the word "mileage" in document 1 is 2 and in document 2 is 1. As such, the weight of the word "mileage" in document $1 = 2*\log(2/2) = 0$, and the weight of the word mileage in document $2 = 1*\log(2/1) = 0.30102999566$. Still further, the frequency of the word "renew" in document 1 is 1, and the frequency of the word "renew" in document 2 is 1. As such, the weight of the word "renew" in document $1 = 1*\log(2/1) = 0.30102999566$, and the weight of the word "renew" in document $2 = 1*\log(2/1) = 0.30102999566$.

As described herein, the weight is generally a term frequency inverse document frequency (TFIDF or tf-idf) weight. The TFIDF weight is a statistical measure used to evaluate how important a word is in a document that is part of a collection of documents. The importance increases proportionally to the number of times the word is used in the document, but is offset by the frequency in which the word is used in the collection. As such, a high TFIDF weight is obtained when a word has a high frequency in a document and a low frequency over the whole collection of documents. This type of weighting tends to filter out common terms.

The weights are associated with those words that are deemed to be top frequency words, or with each word in the list. The weights may then be saved in the database 26, as shown in reference numeral 304. It is to be understood that synonyms may be retrieved for the word/tag list (shown at reference numeral 308), and the synonyms may be stored in the database 26 as well (shown at reference numeral 310). Furthermore, the TFIDF weight for one or more of the words may be adjusted for the synonyms.

The parsed document(s) is/are represented as a vector(s) (as shown at reference numeral 312) with the coordinates taken from the calculated weights of the tags. For example, document 1 in the example given herein is a vector with coordinates (0.30102999566, 1.2) and will be an "n" dimension vector, and document 2 in the example given herein is a vector with coordinates (0.30102999566, 0.30102999566).

The length of each vector is calculated, as shown at reference numeral 314, by determining the square root of the sum of the squares of the coordinates. As such, the length of the vector for document 1 is $\sqrt{(0.30102999566*0.30102999566 + 1.2*1.2)} = 1.237$, and the length of the vector for document 2 is $\sqrt{(0.30102999566*0.30102999566 + 0.30102999566*0.30102999566)} = 0.424$. The dot product of the vectors is determined (in this example, the dot product equals 0.54), and a matrix is built of all the dot products (as shown at reference numeral 316). Generally, each entry in the matrix is the TFIDF value for the blog document. The determinate of the matrix is determined, as shown at reference numeral 318, and this will give an area of interest that is used to generate an idea/action item. It is to be understood that any tag weight from additional posts that are close to the absolute value of the determinate based on a pre-defined weight will be an area of interest for further examination. Furthermore, the matrix dimension may be recursively reduced by adjusting the minimum weight requirements.

In another example of the algorithm, after the blog documents are parsed, the document(s) TFIDF may be computed, the documents may be represented as vectors, the matrix may be generated, and the determinant of the matrix determined without generating the list (302), storing the list (304) and/or generating/storing synonyms for the word list (308, 310).

The method disclosed herein may also be used to engage one or more customers 20 of a vehicle service. As previously mentioned, the authorized person(s) 38 receive or gather information or data that is related to one or more vehicle related events, in this example, services that are provided to one or more vehicles 40. In some instances, the information or data may be received directly from the vehicle user 20 via a telematics unit 46 in the vehicle 40.

A blog that relates to the service(s) is generated and posted in an electronic forum. Since the blog is related to the service(s), the tags that are extracted from the blog are also related to the service(s). Posts are then uploaded in response to the blog. As such, an electronic discussion about the service(s) is received in an electronic discussion forum. The second set of tags is extracted from the posts, and thus relate to the electronic discussion about the service. The semantic relationship between the tags is recognized and analyzed. Information pertaining to the electronic discussion that may be of interest to the vehicle users 20 may be gathered. Such information may relate to the electronic discuss itself, or to the service that is the topic of the discussion. A non-limiting example of information related to the electronic discussion that may be of interest to the vehicle users 20 is that 10,000 posts have been received in response to a particular service related blog, and that the company posting the blog is considering all posts to enhance vehicle services. Such information informs the vehicle user 20 that their concerns are important to the company offering the service(s). Furthermore, one or more ideas or actions items may be generated based on the relationship between the sets of tags.

Information related to the ideas or action items and/or to the electronic discussion is then presented to the vehicle user 20. In one example, the information is presented to the vehicle user 20 while the user is interacting with the service (e.g., the vehicle user 20 is in operative communication with the call center 16 via the telematics unit 46 in the vehicle 40). In this example, the information may be audibly transmitted using the vehicle audio system 48 or visually transmitted via a display 50 in the vehicle 40. In another example, the information is presented to the vehicle user 20 while the user is participating in the electronic discussion (e.g., the vehicle user 20 is logged into the website 12). In this example, the information may be sent electronically, for example, via an email. The call center 16 may recognize that the user 20 is logged on (e.g., by monitoring activity on the website 12, including users logging on and off), and transmit the information to those users 20 identified as being logged on.

Referring back to FIG. 1, the vehicle 40 includes hardware, such as the telematics unit 46 and other components that are operatively connected to the telematics unit 46. Examples of such other hardware components include a microphone 52, a speaker 54 and buttons, knobs, switches, keyboards, and/or controls 56. Generally, these hardware components enable a user 20 to communicate with the telematics unit 46 and any other system components in communication with the telematics unit 46.

Operatively coupled to the telematics unit 46 is a network connection or vehicle bus 58. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 58 enables the vehicle 40 to send and receive signals from the telematics unit 46 to various units of equipment and systems both outside the vehicle 40 and within the vehicle 40 to perform various functions, such as unlocking a door, executing personal comfort settings, and/or the like.

The telematics unit 46 is an onboard device that provides a variety of services, both individually and through its communication with the call center 16. The telematics unit 46 generally includes an electronic processing device 60 operatively coupled to one or more types of electronic memory 62, a cellular chipset/component 64, a wireless modem 66, a navigation unit containing a location detection (e.g., global positioning system (GPS)) chipset/component 68, a real-time clock (RTC) 70, a short-range wireless communication network 72 (e.g., a Bluetooth® unit), and/or a dual antenna 74. In one example, the wireless modem 66 includes a computer program and/or set of software routines executing within processing device 60.

It is to be understood that the telematics unit 46 may be implemented without one or more of the above listed components, such as, for example, the short-range wireless communication network 72. It is to be further understood that telematics unit 46 may also include additional components and functionality as desired for a particular end use.

The electronic processing device 60 may be a micro controller, a controller, a microprocessor, a host processor, and/or a vehicle communications processor. In another example, electronic processing device may be an application specific integrated circuit (ASIC). Alternatively, electronic processing device 60 may be a processor working in conjunction with a central processing unit (CPU) performing the function of a general-purpose processor.

The location detection chipset/component 68 may include a Global Position System (GPS) receiver, a radio triangulation system, a dead reckoning position system, and/or combinations thereof. In particular, a GPS receiver provides accurate time and latitude and longitude coordinates of the vehicle 40 responsive to a GPS broadcast signal received from a GPS satellite constellation.

The cellular chipset/component 64 may be an analog, digital, dual-mode, dual-band, multi-mode and/or multi-band cellular phone.

The telematics unit 46 provides numerous services (which may be the subject of the blog and posts), some of which may not be listed herein. Several examples of such services include, but are not limited to: turn-by-turn directions and other navigation-related services provided in conjunction with the GPS based chipset/component 68; airbag deployment notification and other emergency or roadside assistance-related services provided in connection with various crash and or collision sensor interface modules 76 and sensors 78 located throughout the vehicle 12; and infotainment-related services where music, Web pages, movies, television programs, videogames and/or other content is downloaded by an infotainment center 80 operatively connected to the telematics unit 46 via vehicle bus 58 and audio bus 82. In one non-limiting example, downloaded content is stored (e.g., in memory 62) for current or later playback.

Vehicle communications preferably use radio transmissions to establish a voice channel with wireless carrier system such that both voice and data transmissions may be sent and received over the voice channel. Vehicle communications are enabled via the cellular chipset/component 64 for voice communications and the wireless modem 66 for data transmission. In order to enable successful data transmission over the voice channel, wireless modem 66 applies some type of encoding or modulation to convert the digital data so that it can communicate through a vocoder or speech codec incorporated in the cellular chipset/component 64. It is to be understood that any suitable encoding or modulation technique that provides an acceptable data rate and bit error may be used with the examples disclosed herein. Generally, dual mode antenna 74 services the location detection chipset/component 68 and the cellular chipset/component 64.

Microphone 52 provides the user with a means for inputting verbal or other auditory commands, and can be equipped with an embedded voice processing unit utilizing human/machine interface (HMI) technology known in the art. Conversely, speaker 54 provides verbal output to the vehicle occupants 20 and can be either a stand-alone speaker specifically dedicated for use with the telematics unit or can be part of a vehicle audio component 48. In either event and as previously mentioned, microphone 52 and speaker 54 enable vehicle hardware and call center 16 to communicate with the occupants 20 through audible speech. The vehicle hardware also includes one or more buttons, knobs, switches, keyboards, and/or controls 56 for enabling a vehicle occupant 20 to activate or engage one or more of the vehicle hardware components. In one example, one of the buttons may be an electronic pushbutton used to initiate voice communication with the call center 16 (whether it be a live advisor 28' or an automated call response system 28).

As previously mentioned, the display 50 may be used to transmit information generated in response to the determined blog/post tag relationship to the in-vehicle user 20. The display 50 may be operatively connected to the telematics unit 46 directly, or may be part of the audio component 48. Non-limiting examples of the display 50 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The audio component 48 is operatively connected to the vehicle bus 58 and the audio bus 82. The audio component 48 receives analog information, rendering it as sound, via the audio bus 82. Digital information is received via the vehicle bus 85. The audio component 48 provides AM and FM radio, satellite radio, CD, DVD, multimedia and other like functionality independent of the infotainment center 80. Audio component 48 may contain a speaker system, or may utilize speaker 54 via arbitration on vehicle bus 58 and/or audio bus 82.

The wireless carrier/communication system enables operative communication between the vehicle 40 and the call center 16. The system may be a cellular telephone system or any other suitable wireless system that transmits signals between the vehicle hardware and land network 18. According to an example, wireless carrier/communication system includes one or more cell towers 42, base stations and/or mobile switching centers (MSCs) 44, as well as any other networking components required to connect the vehicle 40 with land network 18. It is to be understood that various cell tower/base station/MSC arrangements are possible and could be used with wireless system. For example, a base station 44 and a cell tower 42 may be co-located at the same site or they could be remotely located, and a single base station 44 may be coupled to various cell towers 42 or various base stations 44 could be coupled with a single MSC. A speech codec or vocoder may also be incorporated in one or more of the base stations 44, but depending on the particular architecture of the wireless network, it could be incorporated within a Mobile Switching Center or some other network components as well.

While several examples have been described in detail, it will be apparent to those skilled in the art that the disclosed examples may be modified. Therefore, the foregoing description is to be considered exemplary rather than limiting.

The invention claimed is:

1. An interactive method for generating at least one action item, comprising:
    selecting data related to a vehicle relationship event;
    via a device with access to a website, generating a blog based on the selected data;
    via the device with access to the website, posting the blog on the website;
    via an information retrieval reporting system operating one or more algorithms, generating a first set of tags from the blog;
    posting at least one blog post on the website in response to the blog;
    via the information retrieval reporting system operating the one or more algorithms, generating a second set of tags from the at least one blog post;
    via the information retrieval reporting system operating the one or more algorithms, recognizing a semantic relationship between the first set of tags and the second set of tags; and
    via the information retrieval reporting system operating the one or more algorithms, creating the at least one action item based on the semantic relationship.

2. The method as defined in claim 1 wherein the data related to the vehicle relationship event includes statistics, program information, or combinations thereof.

3. The method as defined in claim 1 wherein the website is operatively connected to a call center database, and wherein the method further comprises retrieving the selected data from the call center database.

4. The method as defined in claim 1 wherein the website is operatively connected to a call center database, and wherein the method further comprises receiving the selected data from a source other than the call center database.

5. The method as defined in claim 1 wherein the at least one action item is selected from a new product offering, a new service offering, a product update, a service update, or combinations thereof.

6. The method as defined in claim 1 wherein prior to creating the at least one action item and subsequent to recognizing the semantic relationship, the method further comprises:
    via the information retrieval reporting system operating the one or more algorithms, determining a user interest level from the at least one blog post; and
    via the information retrieval reporting system operating the one or more algorithms, analyzing the semantic relationship and the user interest level.

7. The method as defined in claim 1 wherein posting the blog on the website includes:
    receiving a request from a user to access to a secure portion of the website;
    verifying that the requesting user is an authorized user; and
    if the requesting user is an authorized user, granting the requesting user access to the secure portion of the website or if the requesting user if not an authorized user, denying the requesting user access to the secure portion of the website.

8. An interactive information dissemination and retrieval system, comprising:
    a website configured to i) host a blog based on data related to a vehicle relationship event, and ii) receive at least one blog post;
    an information retrieval reporting system including a non-transitory computer-readable storage medium encoded with an algorithm configured to generate a first set of tags from the blog and a second set of tags from the at least one blog post; and
    the non-transitory computer-readable storage medium encoded with an other algorithm configured to i) recognize a semantic relationship between the first and second sets of tags, and ii) analyze the semantic relationship and generate at least one action item based on the semantic relationship.

9. The system as defined in claim 8 wherein the data related to the vehicle relationship event includes statistics, program information, or combinations thereof.

10. The system as defined in claim 8, further comprising a call center database operatively connected to the website, the call center database configured to store the data related to the vehicle relationship event.

11. The system as defined in claim 10, further comprising a source other than the call center database configured to supply the data to the authorized user.

12. The system as defined in claim 8 wherein the at least one action item is selected from a new product offering, a new service offering, a product update, a service update, or combinations thereof.

13. The system as defined in claim 8 wherein the at least one action item is generated based on, in addition to the semantic relationship, a user interest level determined from the at least one blog post.

14. The system as defined in claim 8 wherein the website includes an authentication system that is configured to:
    receive a request from a user to access to a secure portion of the website;
    verify that the requesting user is an authorized user; and
    if the requesting user is an authorized user, grant the requesting user access to the secure portion of the website or if the requesting user if not an authorized user, deny the requesting user access to the secure portion of the website.

15. A method of engaging a customer of a service, the method comprising:
    receiving first information or data related to the service as provided to a vehicle;
    via a device with access to a website, generating a blog based on the received data;
    via the device with access to the website, posting the blog on the website;

via an information retrieval reporting system operating one or more algorithms, generating first tags from the blog, the first tags being related to the service as provided to the vehicle;

in an electronic discussion forum, receiving electronic discussion about the service, the electronic discussion including posting at least one blog post on the website in response to the blog;

via the information retrieval reporting system operating the one or more algorithms, generating second tags from the at least one blog post, the second tags being related to the electronic discussion about the service;

via the information retrieval reporting system operating the one or more algorithms, determining a relationship between the first and second tags; and via a vehicle audio system or a display, presenting the customer with second information in response to the determining.

16. The method as defined in claim 15 wherein the presenting occurs during user interaction with the service, and wherein the second information relates to the electronic discussion.

17. The method as defined in claim 15 wherein the presenting occurs during user interaction with electronic discussion, and wherein the second information relates to the service as provided to the vehicle.

\* \* \* \* \*